US009911375B2

(12) United States Patent
Lee

(10) Patent No.: US 9,911,375 B2
(45) Date of Patent: Mar. 6, 2018

(54) DISPLAY DEVICE

(71) Applicant: SAMSUNG DISPLAY CO., LTD., Yongin, Gyeonggi-Do (KR)

(72) Inventor: Youn Bum Lee, Cheonan-si (KR)

(73) Assignee: Samsung Display Co., Ltd., Yongin, Gyeonggi-do (KR)

( * ) Notice: Subject to any disclaimer, the term of this patent is extended or adjusted under 35 U.S.C. 154(b) by 302 days.

(21) Appl. No.: 14/743,274

(22) Filed: Jun. 18, 2015

(65) Prior Publication Data
US 2016/0210893 A1    Jul. 21, 2016

(30) Foreign Application Priority Data

Jan. 19, 2015  (KR) .................... 10-2015-0008514

(51) Int. Cl.
*G09G 3/20* (2006.01)
*G06F 1/16* (2006.01)
*G06F 3/041* (2006.01)

(52) U.S. Cl.
CPC .......... *G09G 3/2092* (2013.01); *G06F 1/163* (2013.01); *G06F 1/1643* (2013.01); *G06F 3/0416* (2013.01)

(58) Field of Classification Search
None
See application file for complete search history.

(56) References Cited

U.S. PATENT DOCUMENTS

| 6,881,611 | B1* | 4/2005 | Fukasawa | B29C 43/18 257/E21.502 |
|---|---|---|---|---|
| 8,390,757 | B2* | 3/2013 | Kim | G02B 6/0091 349/58 |
| 8,836,650 | B2* | 9/2014 | Wang | G06F 3/0416 345/173 |
| 9,024,530 | B2* | 5/2015 | Land | G09G 3/20 315/152 |
| 2005/0158967 | A1* | 7/2005 | Huang | H01L 21/78 438/460 |
| 2006/0097286 | A1* | 5/2006 | Chung | G02F 1/13452 257/203 |

(Continued)

FOREIGN PATENT DOCUMENTS

JP    4815088 B2    11/2011
KR    10-2007-0026529 A    3/2007

(Continued)

*Primary Examiner* — Patrick Edouard
*Assistant Examiner* — Peijie Shen
(74) *Attorney, Agent, or Firm* — Lee & Morse, P.C.

(57) ABSTRACT

A display device includes a first substrate that is non-rectangular and includes a display area having a plurality of pixels and a non-display area located around the display area, a second substrate that faces the first substrate and overlaps part of the first substrate, an integrated circuit that provides a driving signal to the pixels, and a first pad to which a flexible printed circuit board that delivers an external signal is coupled and which is electrically connected to the integrated circuit. The non-display area of the first substrate includes a first area that extends in a first direction and is exposed from the second substrate and a second area that extends in a second direction different from the first direction and is exposed from the second substrate. The integrated circuit is located in the first area. The first pad is located in the second area.

20 Claims, 16 Drawing Sheets

(56) References Cited

U.S. PATENT DOCUMENTS

| | | | |
|---|---|---|---|
| 2007/0109208 A1* | 5/2007 | Turner | H01Q 1/273 343/718 |
| 2010/0112964 A1* | 5/2010 | Yi | G04G 9/0064 455/90.3 |
| 2011/0221688 A1* | 9/2011 | Byun | H04B 1/385 345/173 |
| 2012/0262397 A1* | 10/2012 | Im | H04M 1/00 345/173 |
| 2013/0088671 A1* | 4/2013 | Drzaic | G02F 1/13452 349/106 |
| 2013/0113712 A1* | 5/2013 | Calvo Alonso | G06F 1/1643 345/173 |
| 2013/0127776 A1* | 5/2013 | Guard | G06F 3/0412 345/174 |
| 2013/0328051 A1* | 12/2013 | Franklin | H01L 29/786 257/59 |
| 2013/0342495 A1* | 12/2013 | Rappoport | H05K 9/0054 345/174 |
| 2014/0049500 A1* | 2/2014 | Chen | G06F 3/0412 345/174 |
| 2014/0049522 A1* | 2/2014 | Mathew | H05B 33/0896 345/204 |
| 2014/0063393 A1* | 3/2014 | Zhong | G02F 1/13306 349/42 |
| 2014/0293144 A1* | 10/2014 | Bae | G06F 3/041 349/12 |
| 2015/0012877 A1* | 1/2015 | Lee | G04G 21/08 715/786 |
| 2015/0169011 A1* | 6/2015 | Bibl | G06F 3/0412 345/175 |
| 2015/0236167 A1* | 8/2015 | Yamazaki | H01L 29/7869 257/43 |
| 2015/0293738 A1* | 10/2015 | Lee | G06F 1/163 345/173 |
| 2015/0348468 A1* | 12/2015 | Chen | G09G 3/3413 345/207 |
| 2015/0362812 A1* | 12/2015 | Aoki | G02B 6/0011 362/611 |
| 2016/0070414 A1* | 3/2016 | Shukla | G06F 3/0418 345/178 |
| 2016/0098965 A1* | 4/2016 | Chiu | G02F 1/1345 345/92 |
| 2016/0116941 A1* | 4/2016 | Kuwabara | G06F 1/163 361/679.03 |
| 2016/0179229 A1* | 6/2016 | Ahn | G06F 3/041 345/173 |
| 2016/0181345 A1* | 6/2016 | Lee | H01L 27/3276 257/40 |
| 2016/0216814 A1* | 7/2016 | Begic | G06F 3/0412 |
| 2016/0291745 A1* | 10/2016 | Grip | G04G 21/08 |
| 2017/0006738 A1* | 1/2017 | Lee | G02F 1/13452 |

FOREIGN PATENT DOCUMENTS

| | | |
|---|---|---|
| KR | 10-2010-0062290 A | 6/2010 |
| KR | 10-2010-0131797 A | 12/2010 |
| WO | WO 2001/059530 A1 | 8/2001 |

* cited by examiner

DISPLAY DEVICE

CROSS-REFERENCE TO RELATED APPLICATION

Korean Patent Application No. 10-2015-0008514, filed on Jan. 19, 2015, in the Korean Intellectual Property Office, and entitled: "Display Device," is incorporated by reference herein in its entirety.

BACKGROUND

1. Field

Embodiments relate to a display device.

2. Description of the Related Art

With the development of information society, the demands on display devices for displaying images are increasing in various aspects. Accordingly, various flat panel display devices such as liquid crystal displays (LCDs), plasma display panels (PDPs) and organic light-emitting displays (OLED) are being utilized.

SUMMARY

Embodiments are directed to a display device including a first substrate that is non-rectangular and includes a display area having a plurality of pixels and a non-display area located around the display area, a second substrate that faces the first substrate and overlaps part of the first substrate, an integrated circuit that provides a driving signal to the pixels, and a first pad to which a flexible printed circuit board that delivers an external signal is coupled and which is electrically connected to the integrated circuit. The non-display area of the first substrate includes a first area that extends in a first direction and is exposed from the second substrate and a second area that extends in a second direction different from the first direction and is exposed from the second substrate. The integrated circuit is located in the first area. The first pad is located in the second area.

The display area of the first substrate and the second substrate may be circular.

The first direction and the second direction may be opposite directions. The first area and the second area may be symmetrical to each other with respect to a virtual center line that crosses a center of the first substrate.

The first area may not overlap the second substrate. The second area may not overlap the second substrate.

The second substrate may further include a touch pattern that overlaps the display area of the first substrate and a second pad that overlaps the non-display area of the first substrate and is electrically connected to the touch pattern.

The second substrate may face a surface of the first substrate. The flexible printed circuit board may be located on another surface of the first substrate to be connected to each of the first pad and the second pad.

The second pad may be located adjacent to the integrated circuit.

The display device may further include a cover window that is located on the second substrate, the cover window being non-rectangular and covering the first area and the second area.

The first area and the second area may include diagonally chamfered corners.

An end of the first area and an end of the second area may be curved.

The integrated circuit may have a curvature corresponding to a curvature of the end of the first area. The first pad may have a curvature corresponding to a curvature of the end of the second area.

The display device may further include a plurality of wiring lines located in the non-display area of the first substrate, the wiring lines electrically connecting the first pad and the integrated circuit.

The first pad may include a plurality of pad electrodes. The wiring lines may correspond to the pad electrodes, respectively. Some of the wiring lines extend along one side of the non-display area, and other ones of the wiring lines extend along another side of the non-display area that is symmetrical to the one side of the non-display area.

Embodiments are also directed to a display device including a first substrate that is non-rectangular and includes a display area having a plurality of pixels and a non-display area located around the display area, a second substrate that faces the first substrate and overlaps part of the first substrate, an integrated circuit that provides a driving signal to the pixels, and a first pad to which a flexible printed circuit board that delivers an external signal is coupled and which is electrically connected to the integrated circuit. The non-display area of the first substrate includes an area exposed from the second substrate. The integrated circuit and the first pad are located on different sides of the exposed area.

A virtual line extending from a central point of a surface of the first substrate to the integrated circuit may form a predetermined angle with a virtual line extending from the central point of the surface of the first substrate to the first pad.

The first substrate and the second substrate may be circular.

The second substrate may further include a touch pattern that overlaps the display area of the first substrate and a second pad that overlaps the non-display area of the first substrate and is electrically connected to the touch pattern.

The second substrate may face a surface of the first substrate. The flexible printed circuit board is located on an other surface of the first substrate to be connected to each of the first pad and the second pad.

The second pad may be located adjacent to the integrated circuit.

The display device may further include a cover window that is located on the second substrate, the cover window being non-rectangular and covering to the exposed area.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
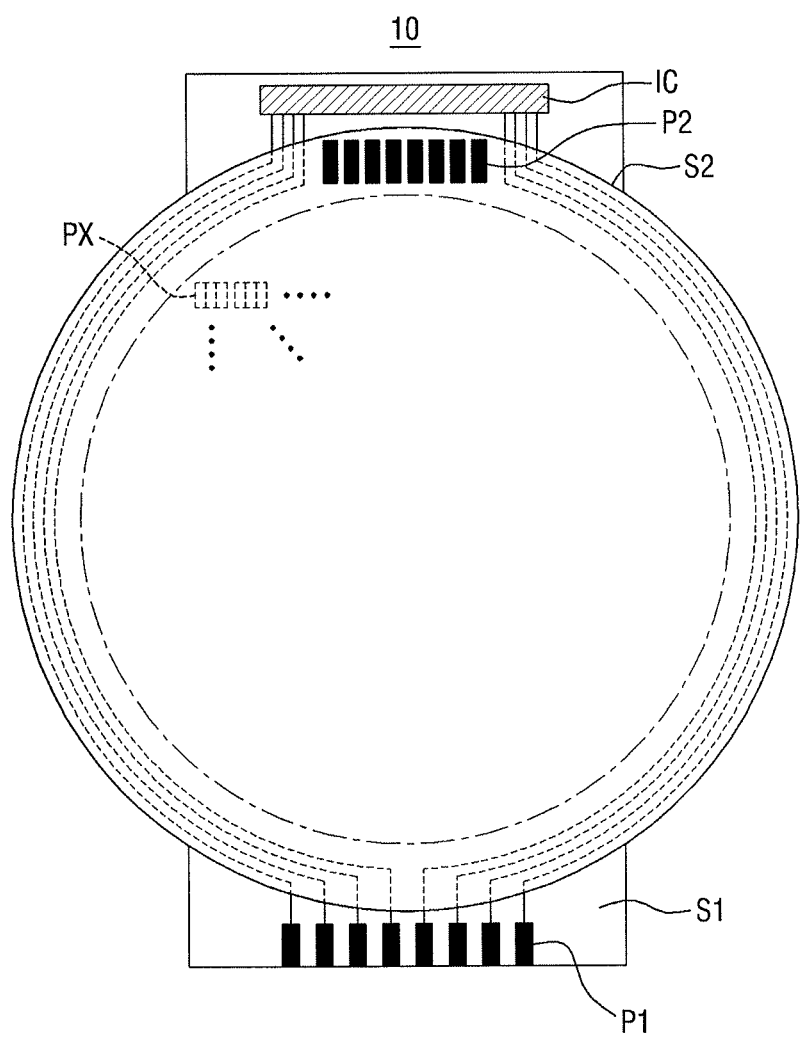
FIG. 1 illustrates a plan view of a display device according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Although the terms "first, second, and so forth" are used to describe diverse constituent elements, such constituent elements are not limited by the terms. The terms are used only to discriminate a constituent element from other constituent elements. Accordingly, in the following description, a first constituent element may be a second constituent element.

A display device is a device that displays an image. The display device may be a liquid crystal display (LCD), an electrophoretic display, an organic light-emitting display (OLED), an inorganic electroluminescent (EL) display, a field emission display, a surface-conduction electron-emitter display (SED), a plasma display, or a cathode ray display.

Hereinafter, an organic light-emitting display will be described as an embodiment of a display device according to an embodiment. However, the display device is not limited to the organic light-emitting display, and various display devices are applicable.

Figure 2:
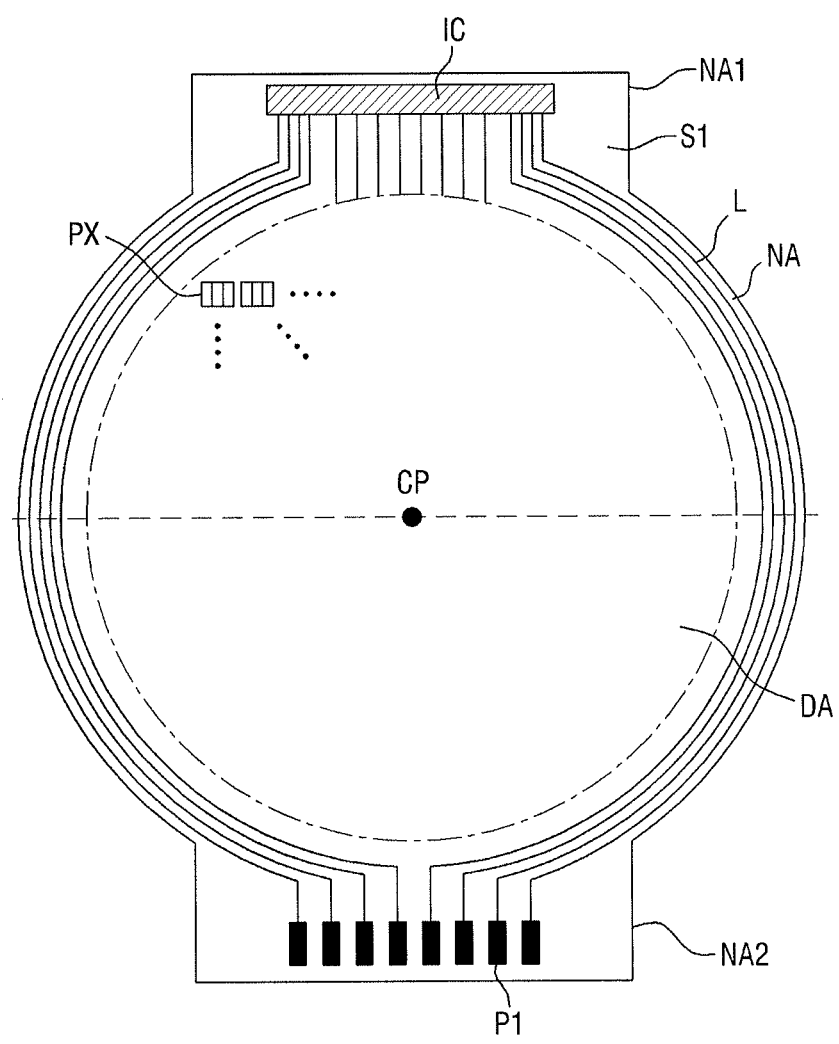
FIG. 2 illustrates a plan view of a first substrate of the display device of FIG. 1.
Figure 3:
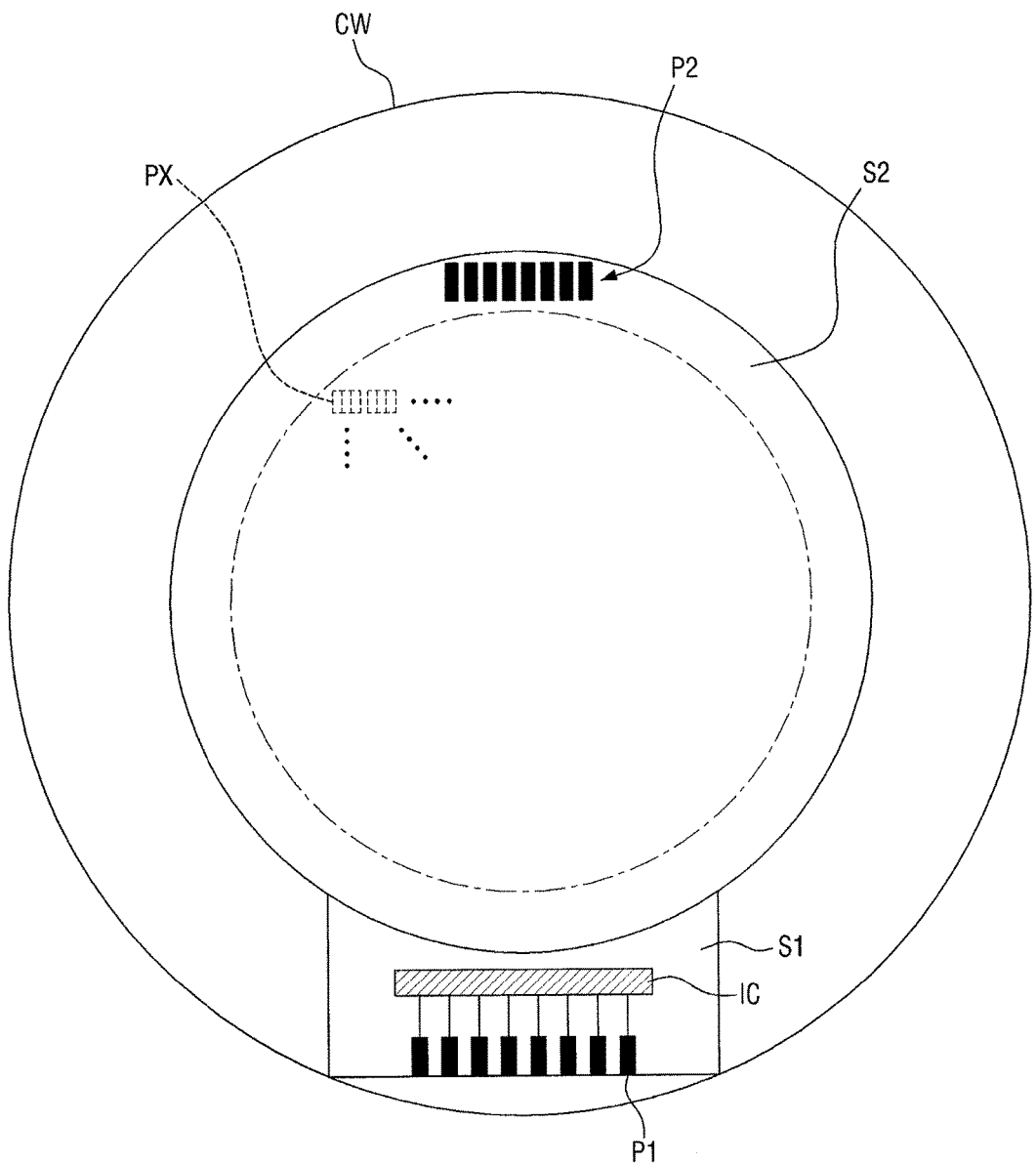
FIG. 3 illustrates a plan view of a cover window placed on a general display device.
Figure 4:
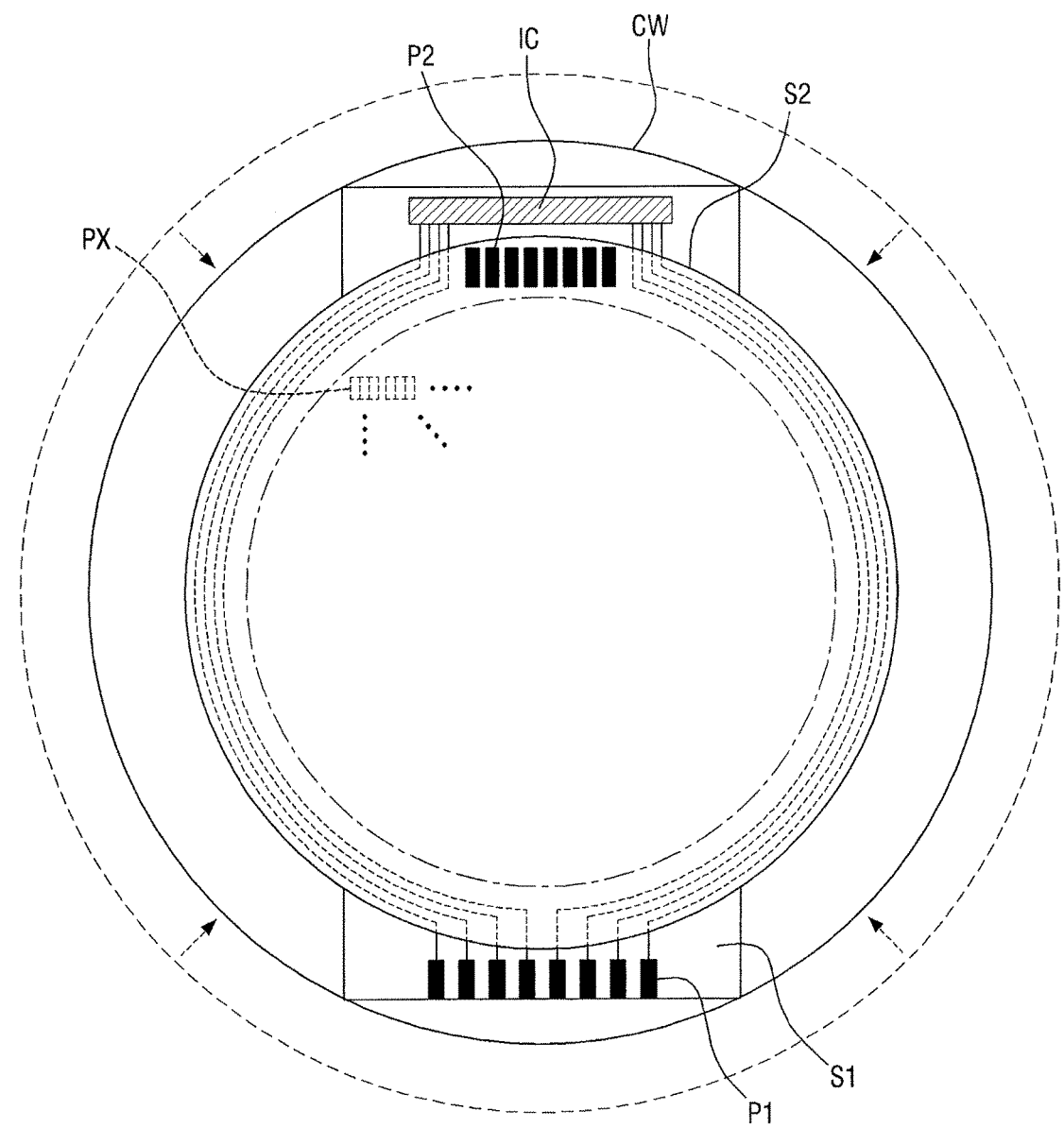
FIG. 4 illustrates a plan view of a cover window placed on the display device of FIG. 1.
Figure 5:
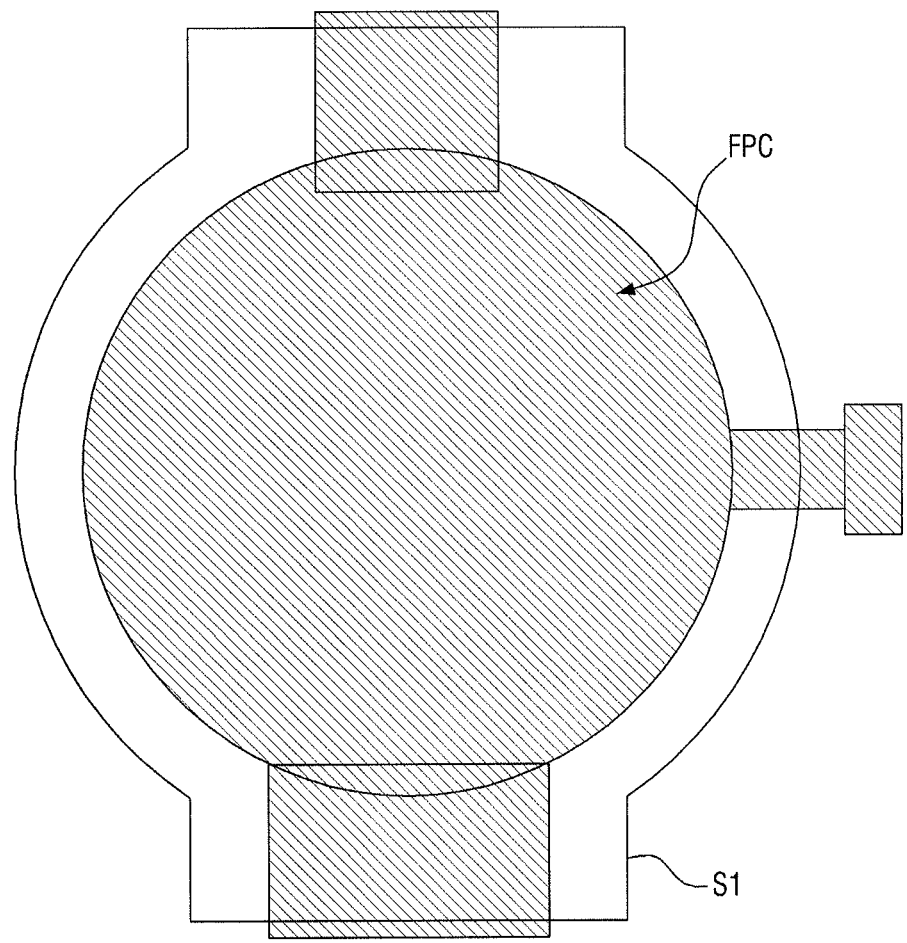
FIG. 5 illustrates a back view of the display device of FIG. 1.
Figure 6:
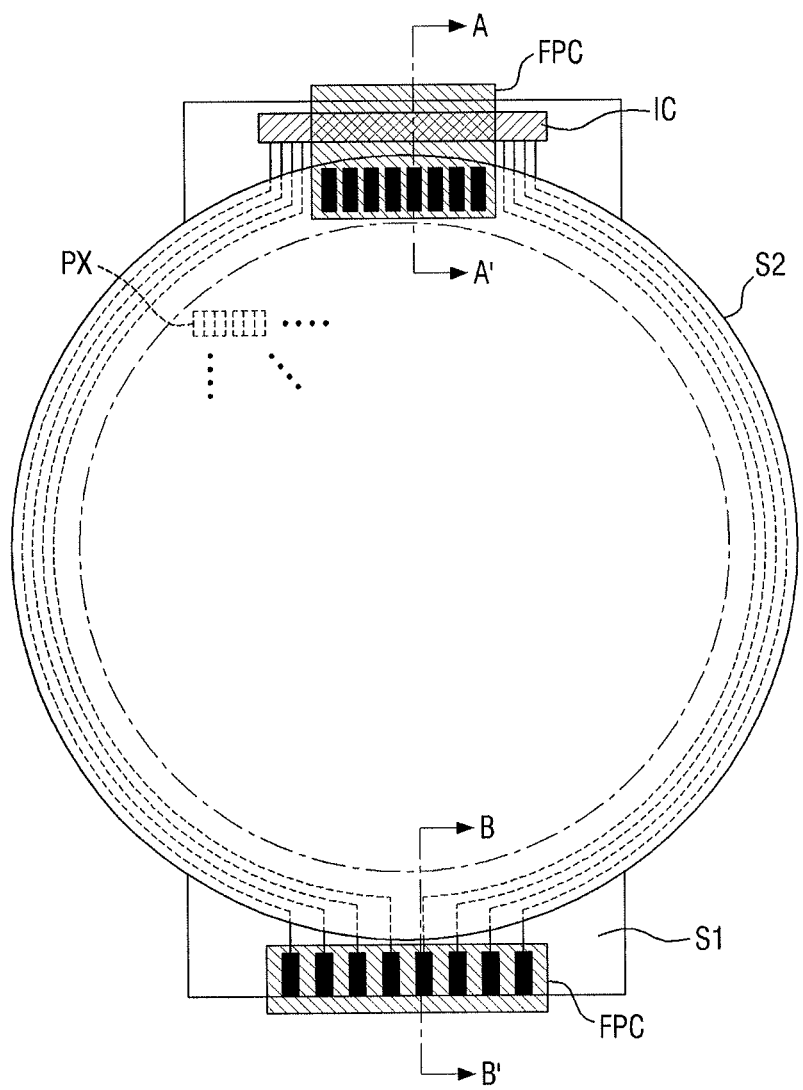
FIG. 6 illustrates a plan view of a flexible printed circuit board coupled to the display device of FIG. 1.
Figure 7:
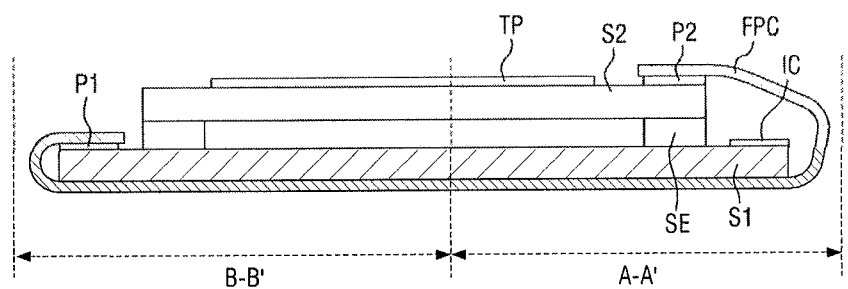
FIG. 7 illustrates a cross-sectional view of the display device taken along the lines A-A' and B-B' of FIG. 6.

FIG. 1 illustrates a plan view of a display device 10 according to an embodiment. FIG. 2 illustrates a plan view of a first substrate S1 of the display device 10 of FIG. 1. FIG. 3 illustrates a plan view of a cover window CW placed on a conventional display device. FIG. 4 illustrates a plan view of a cover window CW placed on the display device 10 of FIG. 1. FIG. 5 illustrates a back view of the display device 10 of FIG. 1. FIG. 6 illustrates a plan view of a flexible printed circuit board FPC coupled to the display device 10 of FIG. 1. FIG. 7 illustrates a cross-sectional view of the display device 10 taken along the lines A-A' and B-B' of FIG. 6.

Referring to FIGS. 1 through 7, the display device 10 according to the current embodiment may include the first substrate S1, a second substrate S2, an integrated circuit IC, and a first pad P1.

The first substrate S1 may be a transparent insulating substrate. For example, the first substrate S1 may be made of a glass substrate, a quartz substrate, a transparent resin substrate, etc. In some implementations, the first substrate S1 may include a polymer with high heat resistance. In an example, the first substrate S1 may contain a material selected from the group of polyethersulfone (PES), polyacrylate (PAR), polyetherimide (PEI), polyethylene naphthalate (PEN), polyethylene terephthalate (PET), polyphenylene sulfide (PPS), polyallylate, polyimide (PI), polycarbonate (PC), cellulose triacetate, cellulose acetate propionate (CAP), poly(arylene ether sulfone), and various combinations thereof. In some embodiments, the first substrate S1 may have flexibility. The first substrate S1 may be a deformable substrate that is be rollable, foldable, bendable, etc.

The first substrate S1 may be non-rectangular. For example, at least part of an outer edge of the first substrate S1 may be curved. In an exemplary embodiment, a display area DA of the first substrate S1 may be circular. In other implementations, the display area DA of the first substrate S1 may have other shapes such as semi-circular, fan-shaped, or oval.

The first substrate S1 may include the display area DA and a non-display area NA. The display area DA may be an area where an image is displayed. The display area DA may include a plurality of pixels PX. Each of the pixels PX may include a display element, a thin-film transistor electrically connected to the display element, etc. The display element may be, for example, an organic light-emitting display element.

The display area DA may be located in a center of the first substrate S1 and may be non-rectangular. The display area DA may be shaped like the first substrate S1.

The non-display area NA is an area where no image is displayed. The non-display area NA may be located around the display area DA. For example, the non-display area NA may occupy an edge portion of the first substrate S1. The non-display area NA may surround the display area DA. In an exemplary embodiment, the non-display area NA may have a donut shape surrounding the entire display area DA.

The second substrate S2 may face the first substrate S1. The second substrate S2 may be spaced apart from the first substrate S1 by a certain distance. A space between the second substrate S2 and the first substrate S1 may be filled with nitrogen. The second substrate S2 may overlap at least part of the first substrate S1. As illustrated in FIG. 1. The second substrate S2 may cover the whole of the display area DA of the first substrate S1 and part of the non-display area NA of the first substrate S1. The second substrate S2 may have substantially the same shape as the display area DA of the first substrate S1. For example, when the display area DA of the first substrate S1 is circular, the second substrate S2 may also be circular. A radius of the second substrate S2 may be greater than that of the display area DA of the first substrate S1, and the second substrate S2 may overlap part of the non-display area DA. The second substrate S2 may be bonded to the first substrate S by a sealant SE, thereby encapsulating the display element, the thin-film transistor, etc. of the first substrate S1. The second substrate S2 may be made of a suitable material that can block external materials. For example, the second substrate S2 may be made of transparent insulating glass or plastic. In an exemplary embodiment, the second substrate S2 may be made of the same material as the first substrate S1.

The non-display area NA of the first substrate S1 may include a first area NA1 and a second area NA2, which protrude in different directions. The first area NA1 may extend along a first direction, and the second area NA2 may extend along a second direction different from the first direction. The first direction and the second direction may be opposite directions. For example, the first area NA1 and the second area NA2 may be symmetrical to each other with respect to a virtual center line that crosses a center CP of the first substrate S1. The first area NA1 and the second area NA2 may be exposed areas not covered by the second substrate S2. For example, the first area NA1 and the second area NA2 may not be overlapped by the second substrate S2. As illustrated in FIG. 2, the first area NA1 and the second area NA2 may be, for example, quadrilateral areas protruding in opposite directions from a circular area.

The integrated circuit IC may be disposed in the first area NA1. The first area NA1 may include a pad electrode on which the integrated circuit IC is mounted. The integrated circuit IC may be electrically connected to the pad electrode and mounted on the first area NA1 in a chip-on-glass (COG) manner. The integrated circuit IC may process an external signal provided by a printed circuit board into a driving signal and provide the driving signal to each pixel PX of the display area DA.

The first pad P1 may be located in the second area NA2. The first pad P1 may be coupled to the flexible printed circuit board FPC which is connected to the printed circuit board to deliver an external signal. The first pad P1 may include a plurality of pad electrodes. The first pad P1 may be coupled to a conductive member of the flexible printed circuit board FPC. The first pad P1 may be electrically connected to the integrated circuit IC of the first area NA1 and may provide an external signal received from the flexible printed circuit board FPC to the integrated circuit IC. The first pad P1 and the integrated circuit IC may be electrically connected to each other by a plurality of wiring lines L. The wiring lines L may be located in the non-display area NA of the first substrate S1, bypassing the display area DA. The wiring lines L may extend in a shape corresponding to the shape of the outer edge of the first substrate S1. The wiring lines L may be connected to the pad electrodes of the first pad P1, respectively. The pad electrodes may be connected to the integrated circuit IC by the corresponding wiring lines L. Some of the wiring lines L may extend along one side of the non-display area NA, and the other ones of the wiring lines L may extend along another side of the non-display area NA that is symmetrical to the one side of the non-display area L. In an example, when the display area DA of the first substrate S1 is circular, some of the wiring lines L may extend in a clockwise direction, and the other ones of the wiring lines L may extend in a counter-clockwise direction.

A shortest straight-line distance between the center CP of the first substrate S1 and the first pad P1 may be, for example, substantially equal to a shortest straight-line distance between the center CP of the first substrate S1 and the integrated circuit IC.

The first pad P1 and the integrated circuit IC of the display device 10 according to the current embodiment may respectively be located in the first area NA1 and the second area NA2 spatially separated from each other. For example, the first pad P1 and the integrated circuit IC may not be disposed adjacent to each other. Accordingly, an area for accommodating the first pad P1 and the integrated circuit IC may be minimized.

The display device 10 according to the current embodiment may further include the cover window CW, which is located on the second substrate S2 to cover the display device 10 up to and including the first area NA1 and the second area NA2. The cover window CW may cover a surface of the display device in a direction in which an image is displayed.

The cover window CW may be made of a transparent material such as glass or plastic. The cover window CW may have a similar shape to the second substrate S2. For example, as illustrated in FIG. 4, when the second substrate S2 is circular, the cover window CW may also be circular.

The cover window CW may include a light-transmitting portion corresponding to the display area DA of the first substrate S1 and a light-blocking portion corresponding to the non-display area NA of the first substrate S1. The light-blocking portion may correspond to an area in which the edge of the display area DA, the first pad P1 and the integrated circuit IC are mounted, and the light-transmitting portion may correspond to the display area DA. The light-blocking portion may block unnecessary light and may hide elements of the first substrate S1 that do not display images. If the first pad P1 and the integrated circuit IC were to disposed adjacent to each other, as illustrated in FIG. 3, the light-blocking portion of the cover window CW would have to be increased to cover the first pad P1 and the integrated circuit IC. The need for an increased light-blocking portion could place limitations on the design of a display device. On the other hand, referring to FIG. 4, the first pad P1 and the integrated circuit IC may be spatially separated in the display device 10 according to the current embodiment. Therefore, the light-blocking portion covering the first pad P1 and the integrated circuit IC may be relatively narrower than the light-blocking portion of FIG. 3. It may be possible to prevent the creation of an unnecessary area and to minimize design limitations of the display device 10. As a result, a display device having a narrow bezel may be obtained.

The display device 10 according to the current embodiment may further include the flexible printed circuit board FPC, a second pad P2, and a touch pattern TP.

Referring to FIG. 5, the flexible printed circuit board FPC may be attached to a back surface of the first substrate S1. The back surface of the first substrate S1 may be a surface on other elements of the first substrate S1 as described above are not formed. For example, when a surface of the first substrate S1 faces the second substrate S2, the flexible printed circuit board FPC may be attached to the other surface of the first substrate S1. The flexible printed circuit board FPC may be made of a bendable, flexible material. An end of the flexible printed circuit board FPC may be bent to be connected to the first pad P1, and another end thereof may be connected to the printed circuit board. The flexible printed circuit board FPC may deliver an external signal received from the printed circuit board to the first pad P1. Another end of the flexible printed circuit board FPC may be connected to the second pad P2.

Referring to FIG. 7, the second pad P2 may be disposed on a surface of the second substrate S2. In addition, the touch pattern TP may be disposed on the surface of the second substrate S2. The second pad P2 may overlap the non-display area NA of the first substrate S1, and the touch pattern TP may overlap the display area DA.

The second pad P2 may be located adjacent to the integrated circuit IC. Assuming that a virtual horizontal line that crosses the central point CP of the first substrate S1 bisects the first substrate S1, the second pad P2 may be included in the same area as the integrated circuit IC but in a different area from the first pad P1.

The touch pattern TP may include a plurality of touch electrodes that sense a location touched by an external object. The touch pattern TP may be formed over a wide area of the second substrate P2 that overlaps the display area DA. The touch pattern TP may include a plurality of touch electrodes connected in a vertical direction and a plurality of touch electrodes connected in a horizontal direction.

The second pad P2 may include a plurality of pad electrodes. The touch electrodes of the touch pattern TP may be electrically connected to the pad electrodes of the second pad P2 by wiring lines. A conductive pattern of another end of the flexible printed circuit board FPC may be electrically coupled to each pad electrode of the second pad P2. The flexible printed circuit board FPC may provide a touch signal received from the second pad P2 to the printed circuit board. The printed circuit board may evaluate and process the touch signal and output a signal corresponding to the touch signal to the first pad P1.

Figure 8:
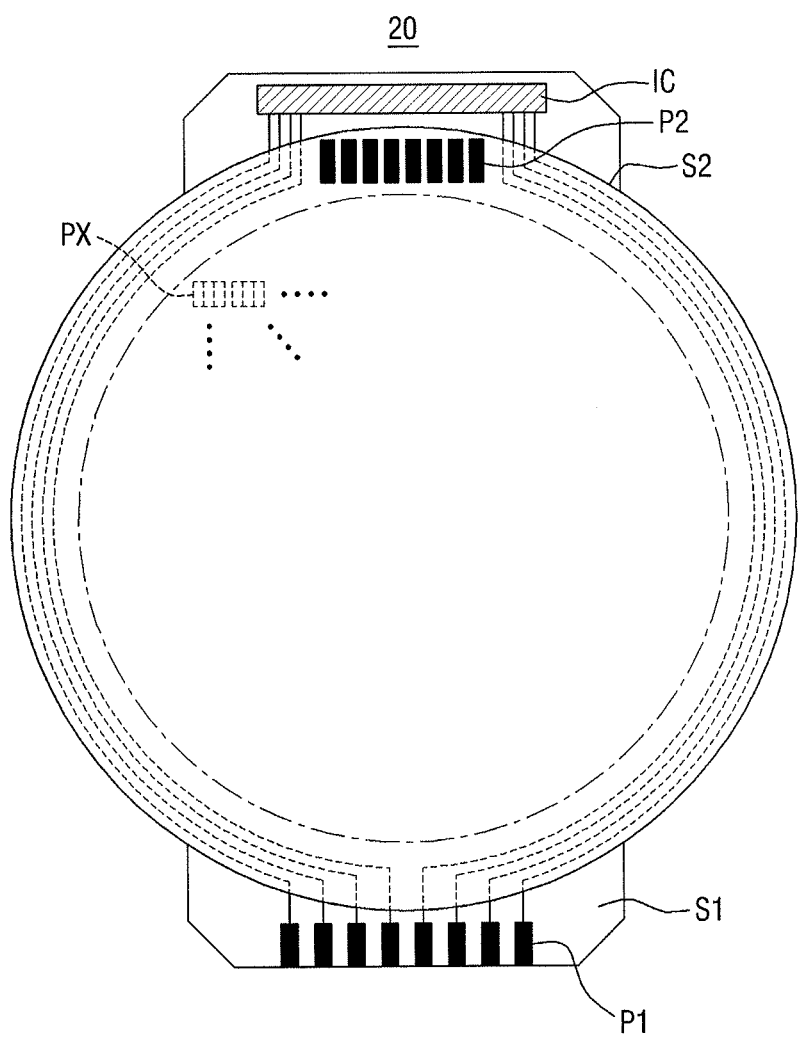
FIG. 8 illustrates a plan view of a display device according to another embodiment.
Figure 9:
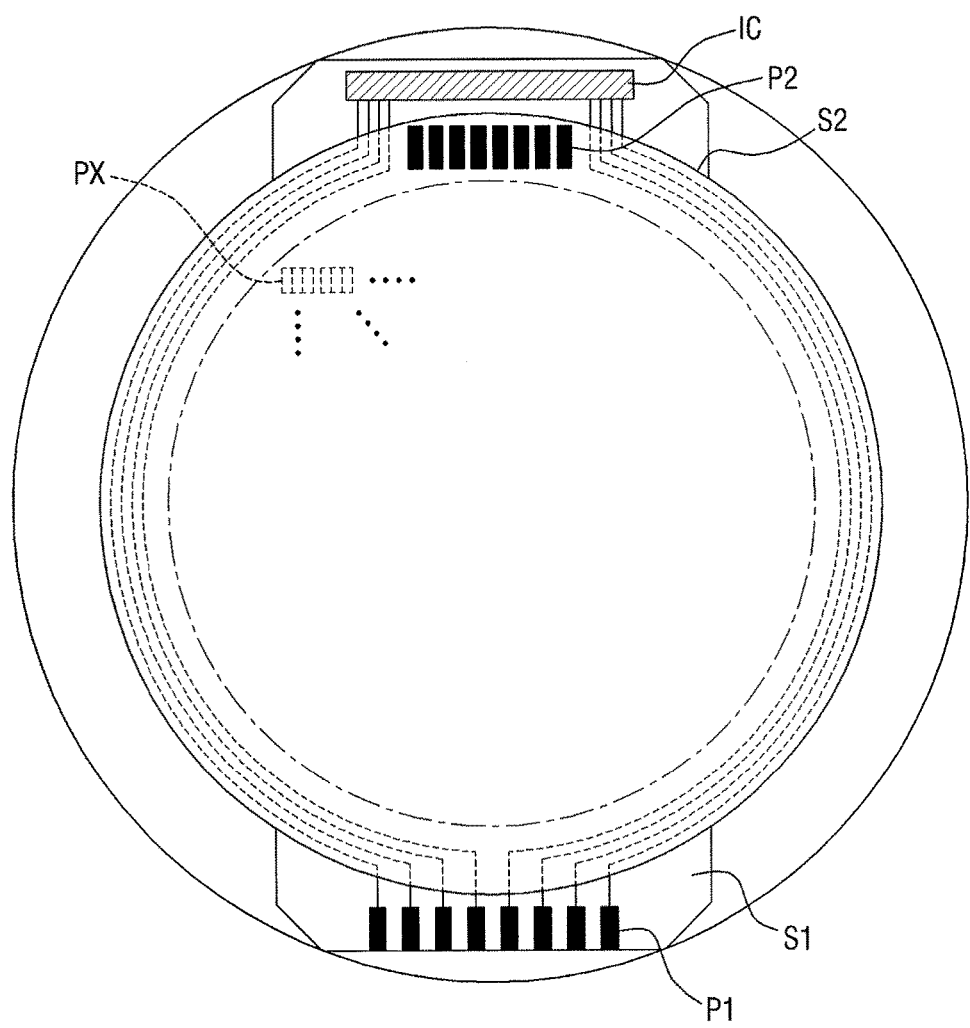
FIG. 9 illustrates a plan view of a cover window placed on the display device of FIG. 8.

FIG. 8 illustrates a plan view of a display device 20 according to another embodiment. FIG. 9 illustrates a plan view of a cover window CW placed on the display device 20 of FIG. 8. For simplicity, a description of elements identical to those described above will not be repeated or will be given briefly, and FIGS. 1 to 7 may be referred to for such elements. The following embodiment will be described, focusing mainly on differences with the previous embodiment.

Referring to FIGS. 8 and 9, the display device 20 according to the current embodiment includes a first substrate S1, a second substrate S2, an integrated circuit IC, and a first pad P1. In a non-display area NA of the first substrate S1, the integrated circuit IC and the first pad P1 may respectively be disposed in a first area NA1 and a second area NA2 which protrude in different directions. Here, both corners of each of the first area NA1 and the second area NA2 may not be rectangular but may be chamfered diagonally. Accordingly, a diameter of the circular cover window CW disposed on the circular second substrate S2 may be reduced. For example, a light-blocking portion of the cover window CW may be reduced. The shape and size of the cover window CW are not limited to the example illustrated in FIG. 9. In some implementations, the cover window CW may have other shapes, such as oval. The angle by which or the degree to which the corners of each of the first area NA1 and the second area NA2 are cut may be adjusted according to the shape and size of the cover window CW. In the display device 20 according to the current embodiment, the light-blocking portion of the cover window CW may be reduced by cutting the corners of each of the first area NA1 and the second area NA2. With fewer limitations on the shape and size of the cover window CW, display devices of various designs can be obtained.

Figure 10:
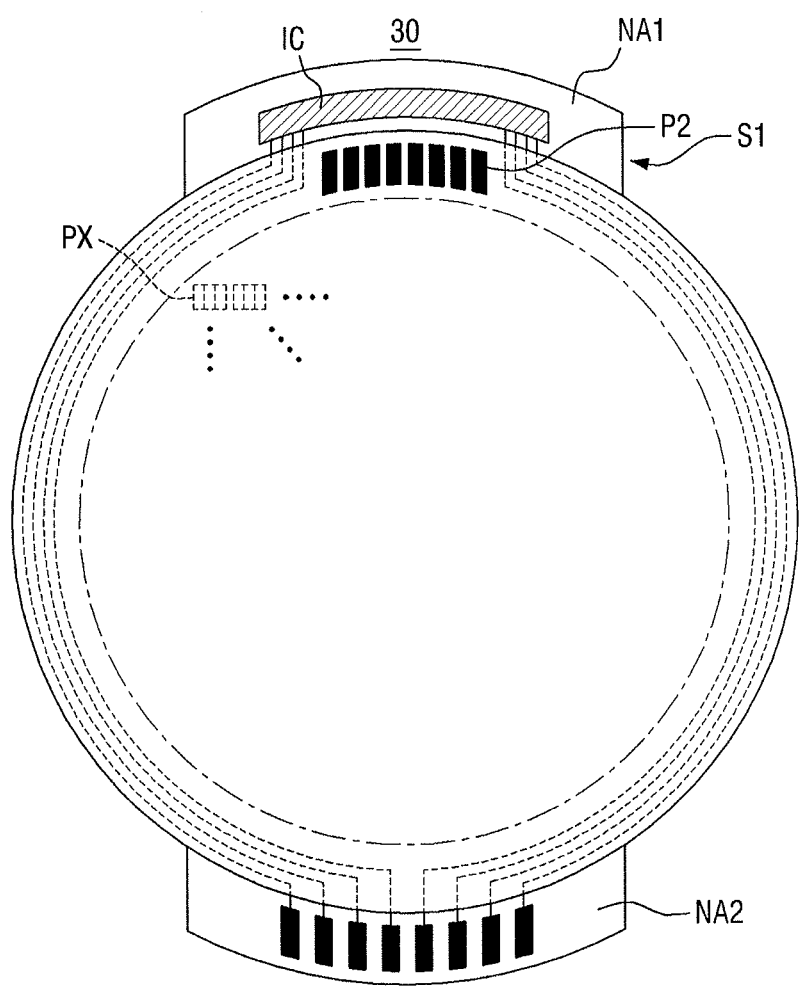
FIG. 10 illustrates a plan view of a display device according to another embodiment.
Figure 11:
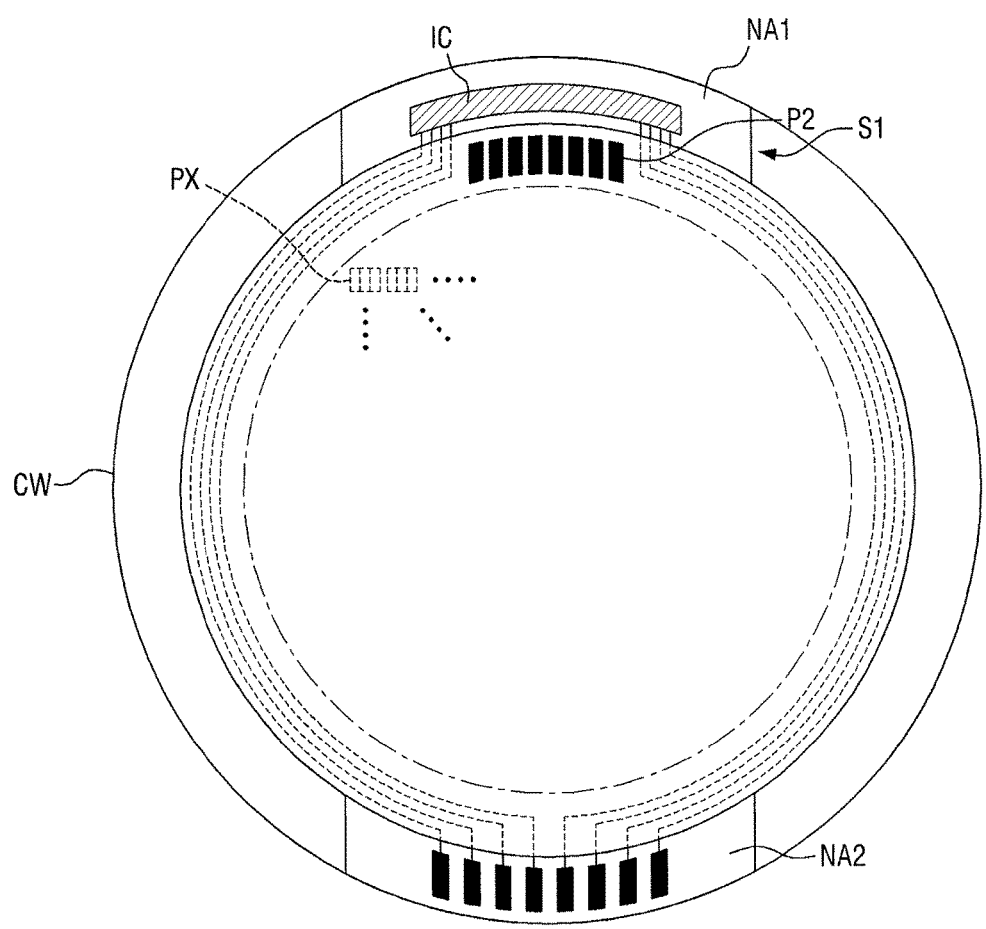
FIG. 11 illustrates a plan view of a cover window placed on the display device of FIG. 10.

FIG. 10 illustrates a plan view of a display device 30 according to another embodiment. FIG. 11 illustrates a plan view of a cover window CW placed on the display device 30 of FIG. 10. For simplicity, a description of elements identical to those described above will not be repeated or will be given briefly, and FIGS. 1 to 7 may be referred to for such elements. The following embodiment will be described, focusing mainly on differences with the previous embodiments.

Referring to FIGS. 10 and 11, the display device 30 according to the current embodiment includes a first substrate S1, a second substrate S2, an integrated circuit IC, a first pad P1, and a second pad P2.

In a non-display area NA of the first substrate S1, the integrated circuit IC and the first pad P1 may respectively be disposed in a first area NA1 and a second area NA2 which extend in different directions. The first substrate S1 may include an at least partially rounded side. The first substrate S1 may be non-rectangular. For example, at least part of an outer edge of the first substrate S1 may be curved. In an exemplary embodiment, a display area DA of the first substrate S1 may be circular. In other implementations, the display area DA of the first substrate S1 may be semi-circular, fan-shaped, or oval. An end of each of the first area NA1 and the second area NA2 may not be straight, but instead may be curved. The end of each of the first area NA1 and the second area NA2 may be bent to have a predetermined curvature. The curved outer edge of the first substrate S1 may have, for example, substantially the same curvature as the end of each of the first area NA1 and the second area NA2.

The integrated circuit IC may be bent with a predetermined curvature. The integrated circuit IC may be bent to have a curvature corresponding to the curvature of the end of the first area NA1. The first pad P1 may be disposed to have a curvature corresponding to the curvature of the end of the second area NA2. A plurality of pad electrodes of the first pad P1 may be located not at the same horizontal location but at different locations to have a predetermined curvature. In addition, as illustrated in FIG. 11, an end of each pad electrode of the first pad P1 may be curved such that the whole of the first pad P1 may have a predetermined curvature. In other implementations, the pad electrodes of the first pad P1 may be rectangular and arranged in a staircase pattern.

When each of the first area NA1, the second area NA2, the integrated circuit IC, and the first pad P1 has a predetermined curvature, a diameter of the circular cover window CW disposed on the circular second substrate S2 may be reduced. For example, a light-blocking portion of the cover window CW may be reduced. The shape and size of the cover window CW may vary.

The second substrate S2 according to the current embodiment may also include an at least partially rounded side. The second pad P2 disposed adjacent to the rounded side of the second substrate S2 may also have a predetermined curvature. For example, a width of the light-blocking portion of the cover window CW that covers the second pad P2 may be reduced. In the display device 30 according to the current embodiment, the light-blocking portion of the cover window CW may be reduced. With fewer limitations on the shape and size of the cover window CW, display devices of various designs can be obtained.

Figure 12:
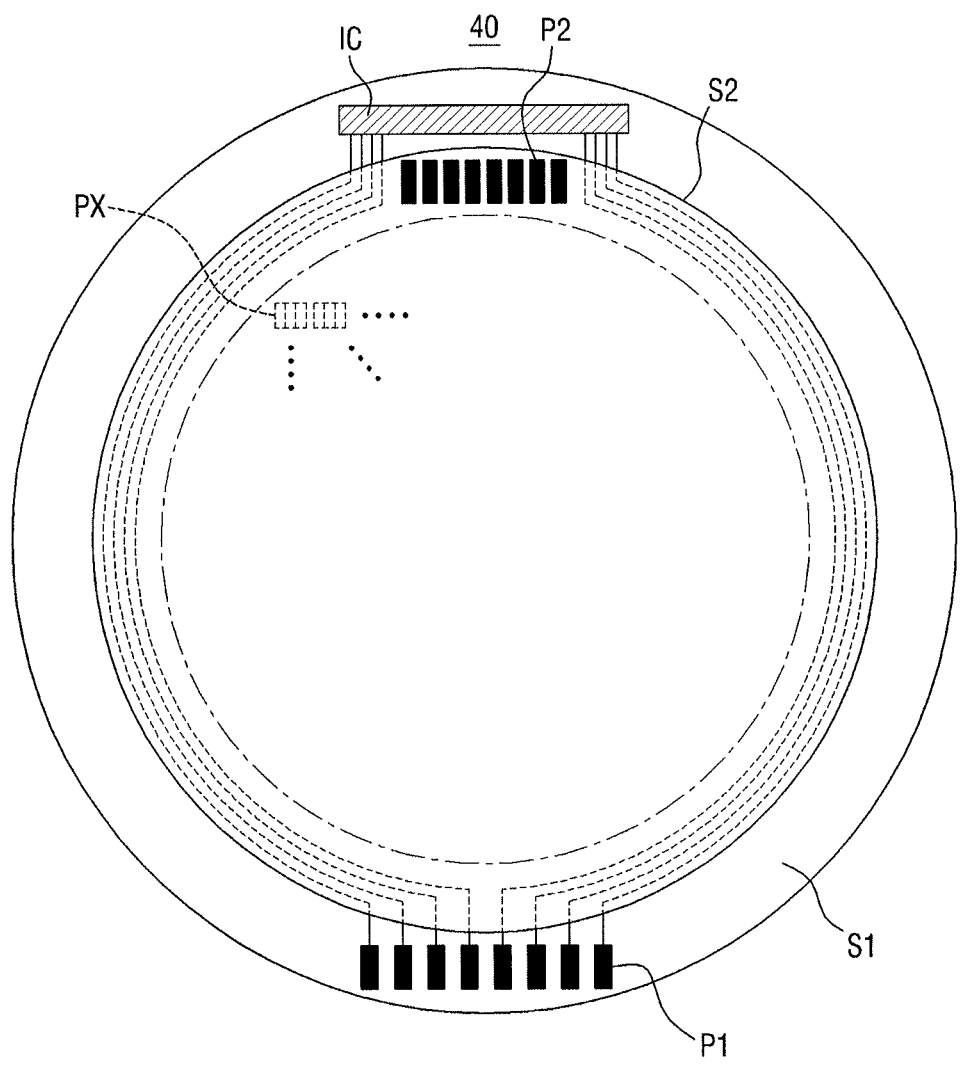
FIG. 12 illustrates a plan view of a display device according to another embodiment.
Figure 13:
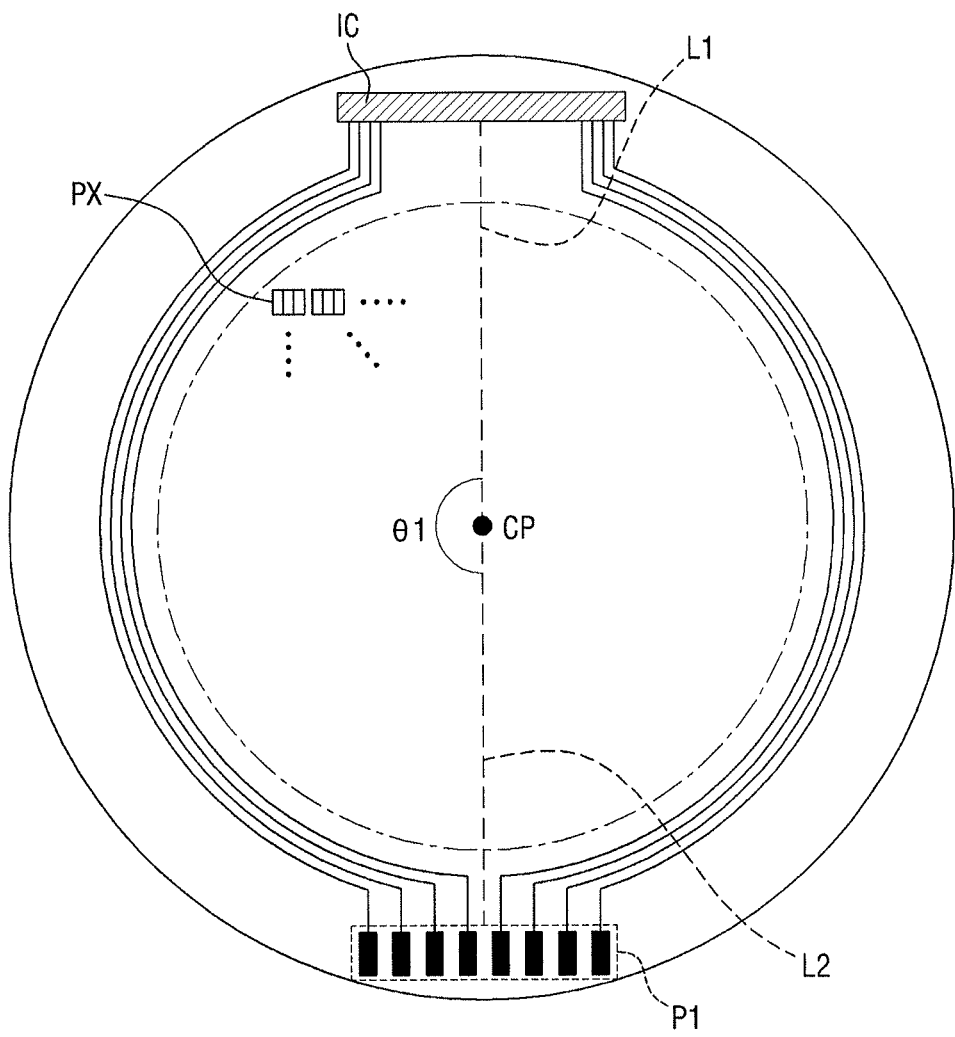
FIGS. 13 and 14 illustrate plan views of a first substrate of the display device of FIG. 12.
Figure 14:
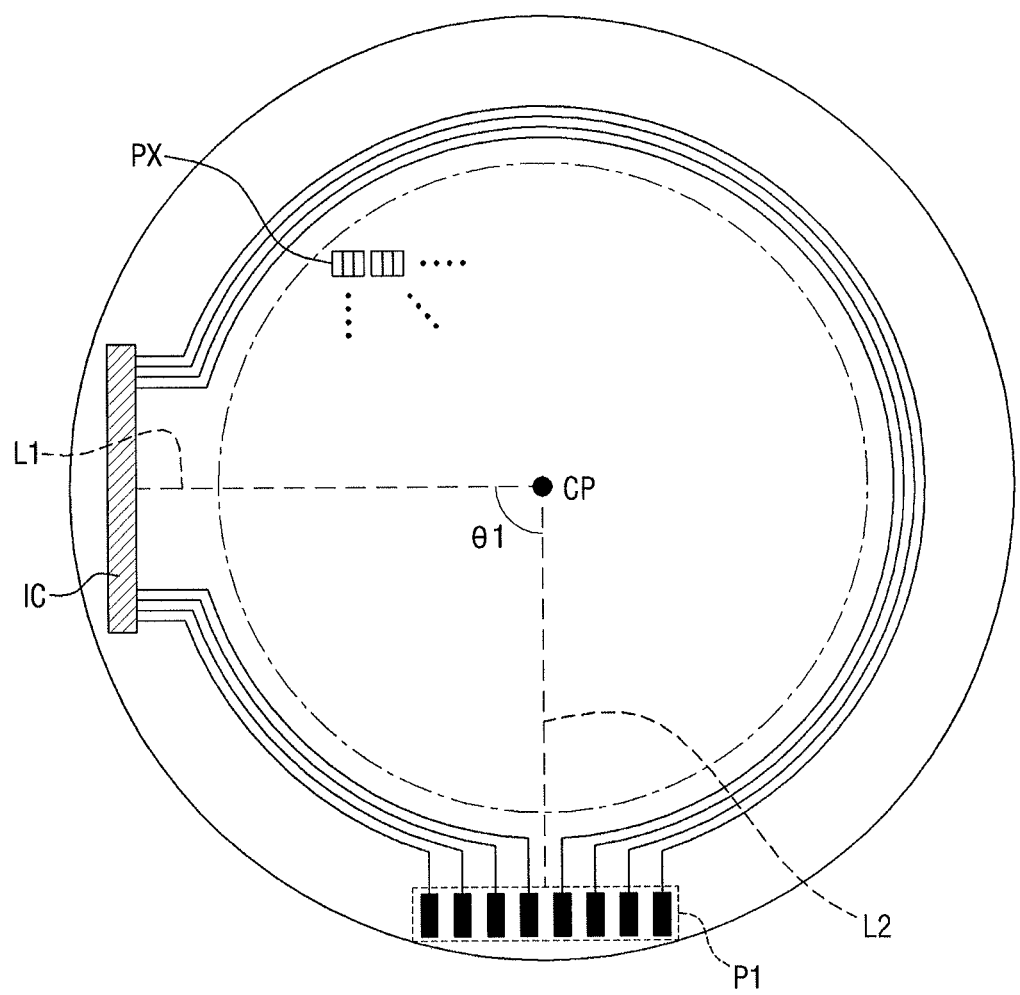
Figure 15:
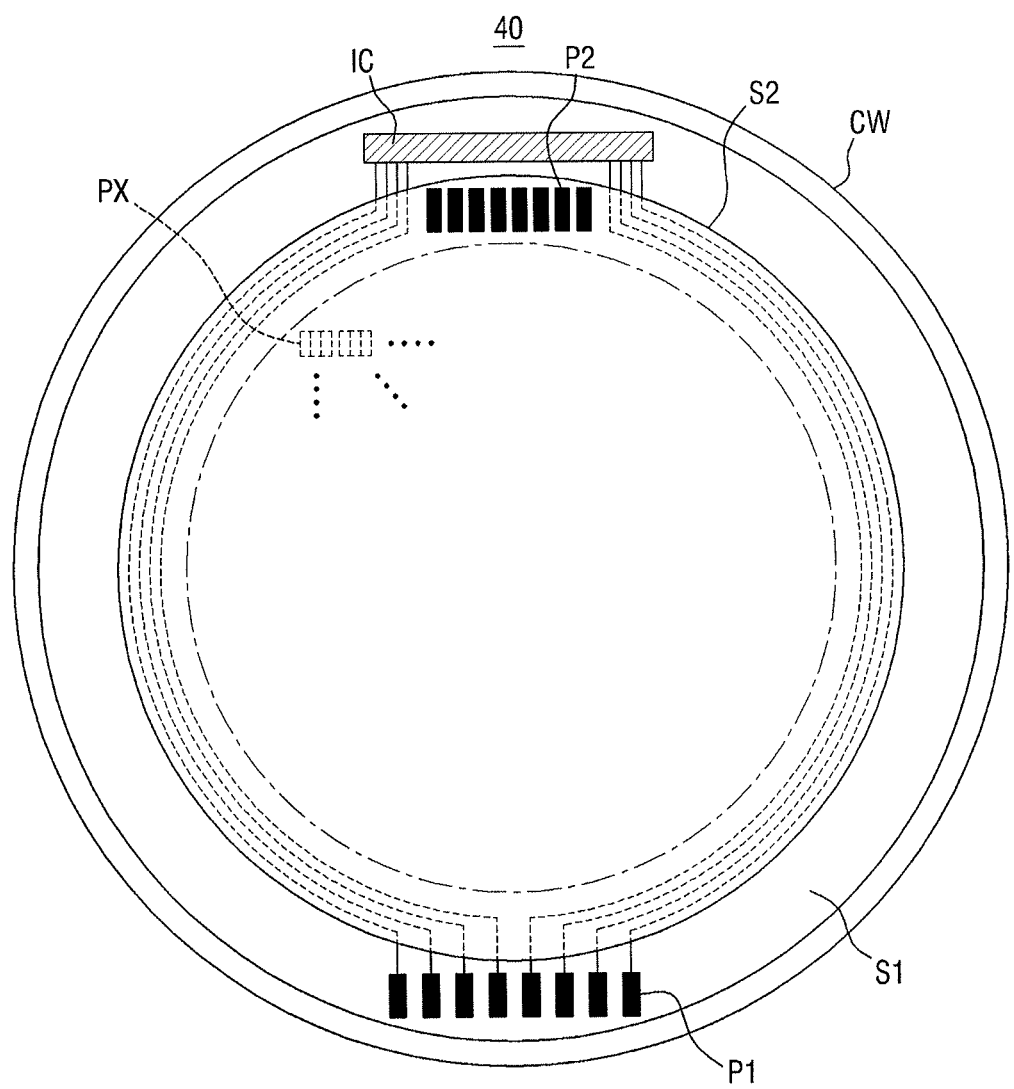
FIG. 15 illustrates a plan view of a cover window placed on the display device of FIG. 12.
Figure 16:
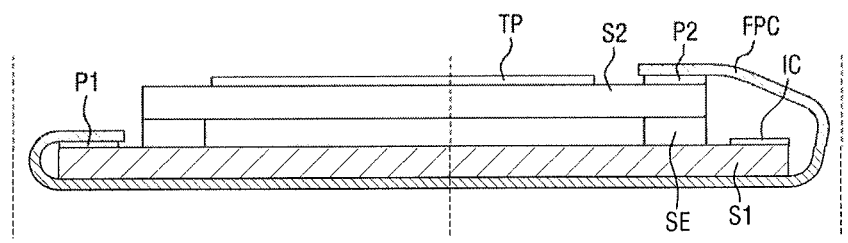
FIG. 16 illustrates a partial cross-sectional view of the display device of FIG. 12.

FIG. 12 illustrates a plan view of a display device 40 according to another embodiment. FIGS. 13 and 14 illustrate plan views of a first substrate S1 of the display device 40 of FIG. 12. FIG. 15 illustrates a plan view of a cover window CW placed on the display device 40 of FIG. 12. FIG. 16 illustrates a partial cross-sectional view of the display device 40 of FIG. 12. For simplicity, a description of elements identical to those described above will not be repeated or will be given briefly. The following embodiment will be described, focusing mainly on differences with the previous embodiments.

Referring to FIGS. 12 through 16, the display device 40 according to the current embodiment includes the first substrate S1, a second substrate S2, an integrated circuit IC, a first pad P1, and a second pad P2.

The first substrate S1 may be non-rectangular. For example, the first substrate S1 and the second substrate S2 may be circular. The first substrate S1 may include a display area DA including a plurality of pixels PX and a non-display area NA located around the display area DA. The second substrate S2 may face the first substrate S1 and overlap part of the first substrate S1. The non-display area NA of the first substrate S1 may include an area exposed from the second substrate S2. The integrated circuit IC providing a driving signal to the pixels PX may be located in the exposed area. In addition, the first pad P1 to which a flexible printed circuit board FPC for delivering an external signal is coupled and which is electrically connected to the integrated circuit IC may be located in the exposed area. The exposed area may be an area in which the integrated circuit IC and the first pad P1 are mounted. The first pad P1 and the integrated circuit IC may be located on different sides of the exposed area. A first virtual line L1 extending from a central point CP of a surface of the first substrate S1 to the integrated circuit IC may form a certain angle with a second virtual line L2 extending from the central point CP of the surface of the first substrate S1 to the first pad P1.

Referring to FIG. 13, the first pad P1 and the integrated circuit IC may be located in the exposed area to be symmetrical to each other. That is, an angle θ1 formed by the first virtual line L and the second virtual line L2 may be 180 degrees. Referring to FIG. 14, the first pad P1 and the integrated circuit IC in some implementations may be located such that the first virtual line L1 and the second virtual line L2 form the angle θ1 of 90 degrees.

When the first pad P1 and the integrated circuit IC are spatially separated from each other, a light-blocking portion of the cover window CW that covers the first pad P1 and the integrated circuit IC may be relatively narrow. Having a narrow width of the light-blocking portion may help to prevent the creation of an unnecessary area and may minimize design limitations of the display device 10. As a result, a display device having a narrow bezel may be obtained.

FIG. 16 illustrates a cross-sectional view of areas where the first pad P1 and the integrated circuit IC are respectively formed. Here, each element of the areas is not limited to the example illustrated in FIG. 16. Referring to FIGS. 15 and 16, a touch pattern TP and the second pad P2 may be formed on a surface of the second substrate S2. The second pad P2 may overlap the non-display area NA of the first substrate S1, and the touch pattern TP may overlap the display area DA of the first substrate S1. The second pad P2 may be located adjacent to the integrated circuit IC. For example, assuming that a virtual horizontal line that crosses the central point CP of the first substrate S1 bisects the first substrate S1, the second pad P2 may be included in the same area as the integrated circuit IC but in a different area from the first pad P1. The touch pattern TP may include a plurality of touch electrodes that can sense a location touched by an external object. The touch pattern TP may be formed over a wide area of the second substrate P2 that overlaps the display area DA. The touch pattern TP may include a plurality of touch electrodes connected in a vertical direction and a plurality of touch electrodes connected in a horizontal direction. The second pad P2 may include a plurality of pad electrodes. The touch electrodes of the touch pattern TP may be electrically connected to the pad electrodes of the second pad P2 by wiring lines.

The flexible printed circuit board FPC may be attached to a back surface of the first substrate S1. The back surface of the first substrate S1 may be a surface on which other elements of the first substrate S1, as described above, are not formed. For example, when one surface of the first substrate S1 faces the second substrate S2, the flexible printed circuit board FPC may be attached to the other surface of the first substrate S1. The flexible printed circuit board FPC may be made of a bendable, flexible material. One end of the flexible printed circuit board FPC may be bent to be connected to the first pad P1, and another end thereof may be connected to the second pad P2. In addition, another end of the flexible printed circuit board FPC may be connected to a printed circuit board. The flexible printed circuit board FPC may provide a touch signal received from the second pad P2 to the printed circuit board. The printed circuit board may evaluate and process the touch signal and output a signal corresponding to the touch signal to the first pad P1.

By way of summation and review, a display device may include a display panel which displays images and a printed circuit board which provides a driving signal to the display panel. The printed circuit board provides a driving signal to an integrated circuit through a flexible printed circuit board. Then, the driving signal may be distributed by the integrated circuit to each pixel of the display panel. The integrated circuit may be mounted on a surface of the display panel in a chip-on-glass (COG) manner, and the flexible printed circuit board may be connected to a pad unit formed adjacent to the integrated circuit so as to deliver a signal received from the printed circuit board to the integrated circuit.

If an integrated circuit and a pad unit are formed adjacent to each other in a non-rectangular display device using the COG method, an additional area of a display panel is required for the integrated circuit and the pad unit. The additional area places limitations on the design of the non-rectangular display device.

Embodiments provide a non-rectangular display device that can minimize design limitations due to the installation of an integrated circuit.

According to embodiments, an area for forming an integrated circuit and a pad unit may be minimized. Design limitations of a non-rectangular display device may be minimized.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A display device, comprising:
    a first substrate that is non-rectangular and includes a display area having a plurality of pixels and a non-display area located around the display area;
    a second substrate that faces the first substrate and overlaps part of the first substrate;
    an integrated circuit that provides a driving signal to the pixels; and
    a first pad to which a flexible printed circuit board that delivers an external signal is coupled and which is electrically connected to the integrated circuit,
    wherein:
        the non-display area of the first substrate includes a first area that extends in a first direction and is exposed from the second substrate and a second area that extends in a second direction different from the first direction and is exposed from the second substrate, and the integrated circuit is located in the first area, and the first pad is located in the second area,
wherein the display area is located between the first area and the second area in a plan view; and
wherein the flexible printed circuit board is electrically connected to a second pad located on the second substrate.

2. The display device as claimed in claim 1, wherein the display area of the first substrate and the second substrate are circular.

3. A display device, comprising:
a first substrate that is non-rectangular and includes a display area having a plurality of pixels and a non-display area located around the display area;
a second substrate that faces the first substrate and overlaps part of the first substrate;
an integrated circuit that provides a driving signal to the pixels; and
a first pad to which a flexible printed circuit board that delivers an external signal is coupled and which is electrically connected to the integrated circuit,
wherein:
the non-display area of the first substrate includes a first area that extends in a first direction and is exposed from the second substrate and a second area that extends in a second direction different from the first direction and is exposed from the second substrate,
the integrated circuit is located in the first area, and the first pad is located in the second area;
the first direction and the second direction are opposite directions,
the first area and the second area are symmetrical to each other with respect to a virtual center line that crosses a center of the first substrate.

4. The display device as claimed in claim 1, wherein:
the first area does not overlap the second substrate, and the second area does not overlap the second substrate.

5. The display device as claimed in claim 1, wherein the second substrate further includes a touch pattern that overlaps the display area of the first substrate and the second pad overlaps the non-display area of the first substrate and is electrically connected to the touch pattern.

6. The display device as claimed in claim 5, wherein:
the second substrate faces a surface of the first substrate, and
the flexible printed circuit board is located on another surface of the first substrate and includes portions that extend beyond the another surface of the first substrate to be connected to each of the first pad and the second pad.

7. The display device as claimed in claim 5, wherein the second pad is located adjacent to the integrated circuit.

8. The display device as claimed in claim 1, further comprising a cover window that is located on the second substrate, the cover window being non-rectangular and covering the first area and the second area.

9. The display device as claimed in claim 1, wherein:
the first area and the second area include diagonally chamfered corners.

10. The display device as claimed in claim 1, wherein an end of the first area and an end of the second area are curved.

11. The display device as claimed in claim 10, wherein:
the integrated circuit has a curvature corresponding to a curvature of the end of the first area, and
the first pad has a curvature corresponding to a curvature of the end of the second area.

12. The display device as claimed in claim 1, further comprising a plurality of wiring lines located in the non-display area of the first substrate, the wiring lines electrically connecting the first pad and the integrated circuit.

13. The display device as claimed in claim 12, wherein:
the first pad includes a plurality of pad electrodes, and
the wiring lines correspond to the pad electrodes, respectively,
wherein some of the wiring lines extend along one side of the non-display area, and other ones of the wiring lines extend along another side of the non-display area that is symmetrical to the one side of the non-display area.

14. A display device, comprising:
a first substrate that is non-rectangular and includes a display area having a plurality of pixels and a non-display area boated around the display area;
a second substrate that faces the first substrate and overlaps part of the first substrate;
an integrated circuit that provides a driving signal to the pixels; and
a first pad to which a flexible printed circuit board that delivers an external signal is coupled and which is electrically connected to the integrated circuit,
wherein:
the non-display area of the first substrate includes an area exposed from the second substrate,
the integrated circuit and the first pad are located on different sides of the exposed area,
the display area is between the integrated circuit and the first pad is in a plan view; and
wherein the flexible printed circuit board is electrically connected to a second pad located on the second substrate.

15. The display device as claimed in claim 14, wherein a virtual line extending from a central point of a surface of the first substrate to the integrated circuit forms a predetermined angle with a virtual line extending from the central point of the surface of the first substrate to the first pad.

16. The display device as claimed in claim 14, wherein the first substrate and the second substrate are circular.

17. The display device as claimed in claim 14, wherein the second substrate further includes a touch pattern that overlaps the display area of the first substrate and the second pad overlaps the non-display area of the first substrate and is electrically connected to the touch pattern.

18. The display device as claimed in claim 17, wherein:
the second substrate faces a surface of the first substrate, and
the flexible printed circuit board is located on an other surface of the first substrate and include portions that extend from the other surface of the first substrate to be connected to each of the first pad and the second pad.

19. The display device as claimed in claim 17, wherein the second pad is located adjacent to the integrated circuit.

20. The display device as claimed in claim 14, further comprising a cover window that is located on the second substrate, the cover window being non-rectangular and covering to the exposed area.

* * * * *